(12) United States Patent
Nuttall et al.

(10) Patent No.: US 10,495,830 B2
(45) Date of Patent: Dec. 3, 2019

(54) OPTICAL FIBER ALIGNMENT DEVICE

(71) Applicant: Elenion Technologies, LLC, New York, NY (US)

(72) Inventors: Nathan A. Nuttall, Castaic, CA (US); Daniel J. Blumenthal, Santa Barbara, CA (US); Ari Novack, New York, NY (US); Holger N. Klein, Santa Barbara, CA (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/013,666

(22) Filed: Jun. 20, 2018

(65) Prior Publication Data

US 2018/0314017 A1    Nov. 1, 2018

Related U.S. Application Data

(63) Continuation of application No. 15/467,061, filed on Mar. 23, 2017, now Pat. No. 10,025,045, which is a continuation of application No. 14/993,460, filed on Jan. 12, 2016, now Pat. No. 9,638,859.

(51) Int. Cl.
*G02B 6/42*    (2006.01)
*G02B 6/30*    (2006.01)

(52) U.S. Cl.
CPC ............. *G02B 6/4242* (2013.01); *G02B 6/30* (2013.01); *G02B 6/423* (2013.01); *G02B 6/428* (2013.01); *G02B 6/4239* (2013.01); *G02B 6/4243* (2013.01); *G02B 6/4245* (2013.01); *G02B 6/4249* (2013.01); *G02B 6/4253* (2013.01); *G02B 6/4274* (2013.01)

(58) Field of Classification Search
None
See application file for complete search history.

(56) References Cited

U.S. PATENT DOCUMENTS

| | | | | |
|---|---|---|---|---|
| 6,222,967 B1 * | 4/2001 | Amano | ................... | G02B 6/30 385/49 |
| 10,025,045 B2 * | 7/2018 | Nuttall | ................... | G02B 6/30 |

* cited by examiner

*Primary Examiner* — Michael Stahl
(74) *Attorney, Agent, or Firm* — Stratford Managers Corporation

(57) ABSTRACT

A fiber alignment or "fiberposer" device enables the passive alignment of one or more optical fibers to a photonic integrated circuit (PIC) device using mating hard-stop features etched into the two devices. Accordingly, fiber grooves can be provide separate from the electrical and optical elements, and attached to the PIC with sub-micron accuracy. Fiberposers may also include a hermetic seal for a laser or other device on the PIC. All of these features significantly reduce the typical cost of an actively aligned optical device sealed in an hermetic package.

16 Claims, 6 Drawing Sheets

OPTICAL FIBER ALIGNMENT DEVICE

CROSS-REFERENCE TO RELATED APPLICATIONS

This application is a continuation of U.S. patent application Ser. No. 15/467,061, filed Mar. 23, 2017, now allowed, which is a continuation of U.S. patent application Ser. No. 14/993,460, filed Jan. 12, 2016, now U.S. Pat. No. 9,638,859, which is hereby incorporated by reference herein in its entirety.

TECHNICAL FIELD

The present invention relates to an optical fiber alignment device, and in particular to a device for aligning an optical fiber to a photonic integrated chip (PIC).

BACKGROUND

Conventional solutions to the alignment of an optical fiber or fiber array involve actively aligning the optical fiber, and then epoxying, laser welding or soldering the optical fiber in place. Some alternative solutions use v-grooves to passively align an optical fiber to a PIC device, but the v-grooves form part of the PIC device, and do not include any hermetic seal for a laser device, or hard stop alignment features for the optical fibers.

An object of the present invention is to overcome the shortcomings of the prior art by providing a passive alignment device for photonic integrated circuits that decouples the optical fiber alignment features from the PIC.

SUMMARY OF THE INVENTION

Accordingly, the present invention relates to an optical fiber alignment device for aligning an optical fiber with an optical waveguide in a photonic integrated circuit (PIC) comprising: a base; a groove in said base for receiving a portion of the optical fiber, whereby a core of the optical fiber is aligned with a core of the optical waveguide of the PIC; first alignment features extending from the base for abutting a hard stop layer on the PIC; first bonding pads mounted on the base for bonding with corresponding second bonding pads on the PIC via a bonding material disposed therebetween; and a cavity in the base for receiving an electronic or opto-electronic component extending from the PIC.

Another aspect of the present invention relates to a photonic integrated chip assembly comprising: the optical fiber alignment device detailed above; and the PIC, including: the hard stop layer abutting with the first alignment features; the second bonding pads bonded to the first bonding pads with an adhesive material therebetween; and an electronic or opto-electronic component received in the cavity.

Another feature of the present invention provides a method of aligning an optical fiber to a waveguide on a photonic optical chip (PIC) comprising: providing an optical fiber alignment device for aligning an optical fiber with an optical waveguide on a photonic integrated circuit (PIC) comprising: a base; a groove in said base for receiving a portion of the optical fiber, whereby a core of the optical fiber is aligned with a core of the optical waveguide of the PIC; first alignment features extending from the base for abutting a hard stop layer on the PIC; first bonding pads mounted on the base for bonding with corresponding second bonding pads on the PIC via an adhesive material disposed therebetween; and a cavity in the base for receiving an electronic or opto-electronic component extending from the PIC; providing the PIC comprising: the hard stop layer for abutting with the first alignment features; the second bonding pads for bonding to the first bonding pads with the adhesive material therebetween; and an electronic or opto-electronic component received in the cavity; mounting the optical fiber alignment device on the PIC with the first alignment features aligned with the hard stop layer, and the first bonding pads aligned with the second bonding pads with the adhesive material therebetween, whereby the optical fiber alignment device is spaced from the photonic chip by the adhesive material; and activating the adhesive, whereby the adhesive flows and the first alignment features of the fiber alignment device move into contact with the hard stop layer of the photonic optical chip.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
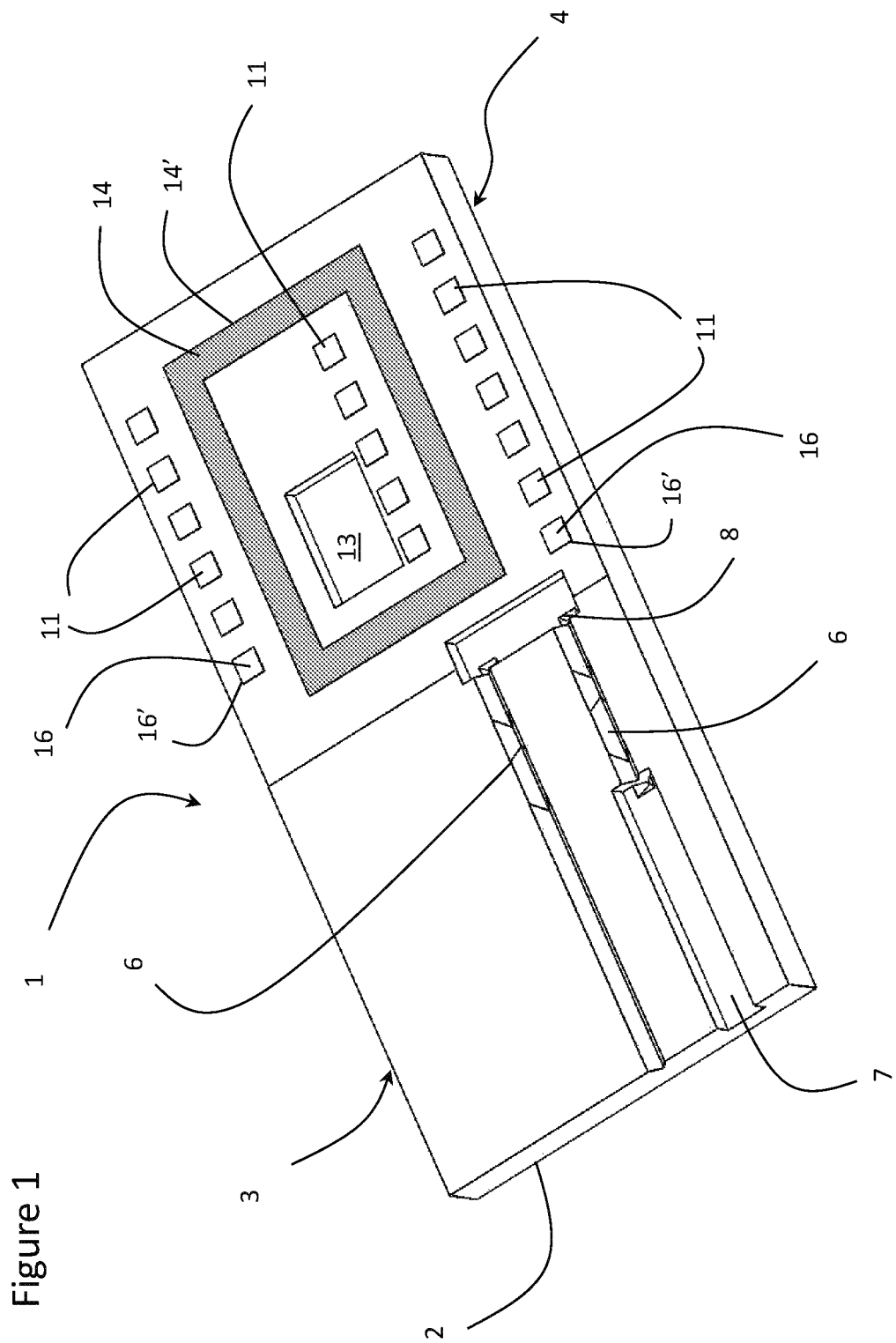
FIG. 1 illustrates an isometric view of an optical fiber alignment device according to the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1 to 4, an optical assembly of the present disclosure includes a fiber alignment device 1, for aligning a core of an optical fiber 5 with a core of an optical waveguide 9 on a photonic integrated circuit 10. The fiber alignment device 1 (FIG. 1) includes a base 2, which may be comprised of silicon, glass, any other suitable semiconductor material, or any other suitable moisture barrier material. The base 2 may be comprised of a fiber-mounting section 3 and a photonic integrated circuit (PIC) mounting section 4 adjacent to each other. At least one groove 6, e.g. u-groove or v-groove, but preferably a high-tolerance v-groove or u-groove array, extends from an edge of the base 2 in the fiber-mounting section 3 or from a fiber jacket cavity 7, at the edge of the base 2 in the fiber-mounting section 4, for receiving at least one optical fiber 5. Each groove 6 extends to an end point within the base 2, effectively defining the juncture between the fiber-mounting section 3 and the PIC-mounting section 4 where optical coupling between the fiber 5 and the waveguide 9 takes place. Preferably, each groove 6 includes a small trough 8 about half the depth of the groove 6 deeper at the end thereof for collecting debris, e.g. dust and adhesive, that may interfere with the optical alignment or coupling between the waveguide 9 and the optical fiber 5.

Suitable first alignment features 11, such as pillars extending perpendicularly from base 2, are provided preferably in both the fiber-mounting section 3 and the PIC-mounting section 4. The first alignment features 11 engage, e.g. extend through, second alignment features 12, e.g., openings in the upper layer of the PIC 12, for abutting or engaging a hard stop layer, e.g. the waveguide layer 9, on the PIC 10. The first alignment features 11 may be created through an etching process, which leaves the first alignment features 11 at the original height of the chip top surface, e.g., 3 to 25 um above the base 2.

In addition to the fiber jacket cavity 7, there may also be one or more deep cavities 13 that are created in the PIC-mounting section 4 of the base 2 at the same or different depth as the first alignment features 11 for receiving any other chip or element, e.g., component 15, that resides on the PIC 10, and that requires a relief under the base 2 of the fiber alignment device 1. A bonding pad ring of an adhesive material 14, e.g. metal and deposited solder or other suitable hermetic sealing material, may be provided in a recess 14' the base 2 to surround each deep cavity 13 for hermetically sealing corresponding components 15 in between the fiber alignment device 1 and the top of the PIC 10. There may also be numerous bonding, e.g. metal, pads 16 disposed on the base 2, preferably at the bottom of recesses 16', throughout the PIC-mounting section 4 that are used for high precision attachment of the PIC 10 to the PIC-mounting section 4 through a bonding, e.g. soldering, process. The bonding pads 16 may be comprised of a number of layers of different metals with one or more solder layers 18 deposited on the top thereof.

The first alignment features 11 created by the shallow etch of the fiber alignment device 1 may be used to achieve a very accurate (sub-micron accuracy) vertical alignment to the PIC 10 by hard-stop bonding these alignment features 11 to a hard stop layer at the bottom of the corresponding second alignment features, e.g., openings 12, created on the PIC 10 at or near the same level as the optical waveguide 9 or other suitable high tolerance feature on the PIC 10 that is desired. In the preferred embodiment, the second alignment features 12, e.g., openings, are bigger, i.e. length and width, than the alignment features 11, e.g. pillars, to enable X-Y alignment of the fiber alignment device 1 to the PIC 10. The bonding pads 14 and 16 with adhesive, e.g. solder 18, deposited on them then align to mating bonding pads 21 and 17, respectively, on the PIC 10 and are bonded together during the alignment and assembly process. Excess melted adhesive material will bulge or drip into the recesses 14' and 16' instead of getting between the fiber alignment device 1 and the PIC 10, and effecting their expected vertical placement. Most if not all of the bonding contacts, e.g. metal pads 14, 16, 17 and 21, from the fiber alignment device 1 to the PIC 10 are non-electrical and only required for mechanical strength. Excess metal contact bonding is a great benefit because it increases the yield for non-contact or electrically shorted situations, since every metal pad 14, 16, 17 and 21 is not required to make good contact to hold the fiber alignment device 1 at the required strength. However, some electrical contacts using a similar structure may also be included, if required by the overall design.

The PIC 10 may be comprised of any suitable material, and include any combination of optical, electro-optical or electronic components, such as lasers, amplifiers and photodetectors. Typically, the PIC 10 includes a bottom handle or substrate layer 31, comprised or for example silicon, and a plurality of semiconductor layers 32, e.g., silica, supported thereby, with any combination of vias and traces for transmitting electrical power and signals. Wire bond pads 33 may be provided on the surface of the semiconductor layers 32 enabling external electrical wiring for power, control or communication signals to be connected to the PIC 10. The waveguide layer 9 and the components 15 are supported by the semiconductor layers 32. Additional semiconductor and protective layers may be provided over top of the waveguide layer 9 through which the openings 12 are formed enabling the first alignment features 11 to reach the hard stop layer, e.g. waveguide layer 9.

Each groove 6, e.g. v-groove array, at one end of the fiber alignment device 1, may be etched or machined into the base 2 using typical processes by etching along the crystal planes or machining that gives the vertical and horizontal placement to within sub-micron tolerance. The fiber jacket cavity 7 at the back end of the fiber-mounting section 3 may be used to epoxy a 0.25 mm acrylate fiber jacket(s) into the fiber alignment device 1, and is usually from 0.13 mm to 0.25 mm deep. The optical height of the fibers 5 are controlled by the machined/etch depth of the grooves 6 and is set to 1 to 20 microns above the surface of the PIC 10, depending on the depth of the waveguide 9 on the PIC 10 that the fiber alignment device 1 mates to, as the core of the fiber 5 must align to the core of the optical waveguide 9 on the PIC 10. As mentioned above, there may be the trough 8 about ¼ to ½ the depth of the groove 6 at the end of the grooves 6 to provide a collection area for excess adhesive and/or to relieve any irregularities at the ends of the fibers 5. This may be required to position the fibers 5 properly to precisely align them to the optical waveguide 9 on the PIC 10 during the assembly process.

Figure 2:
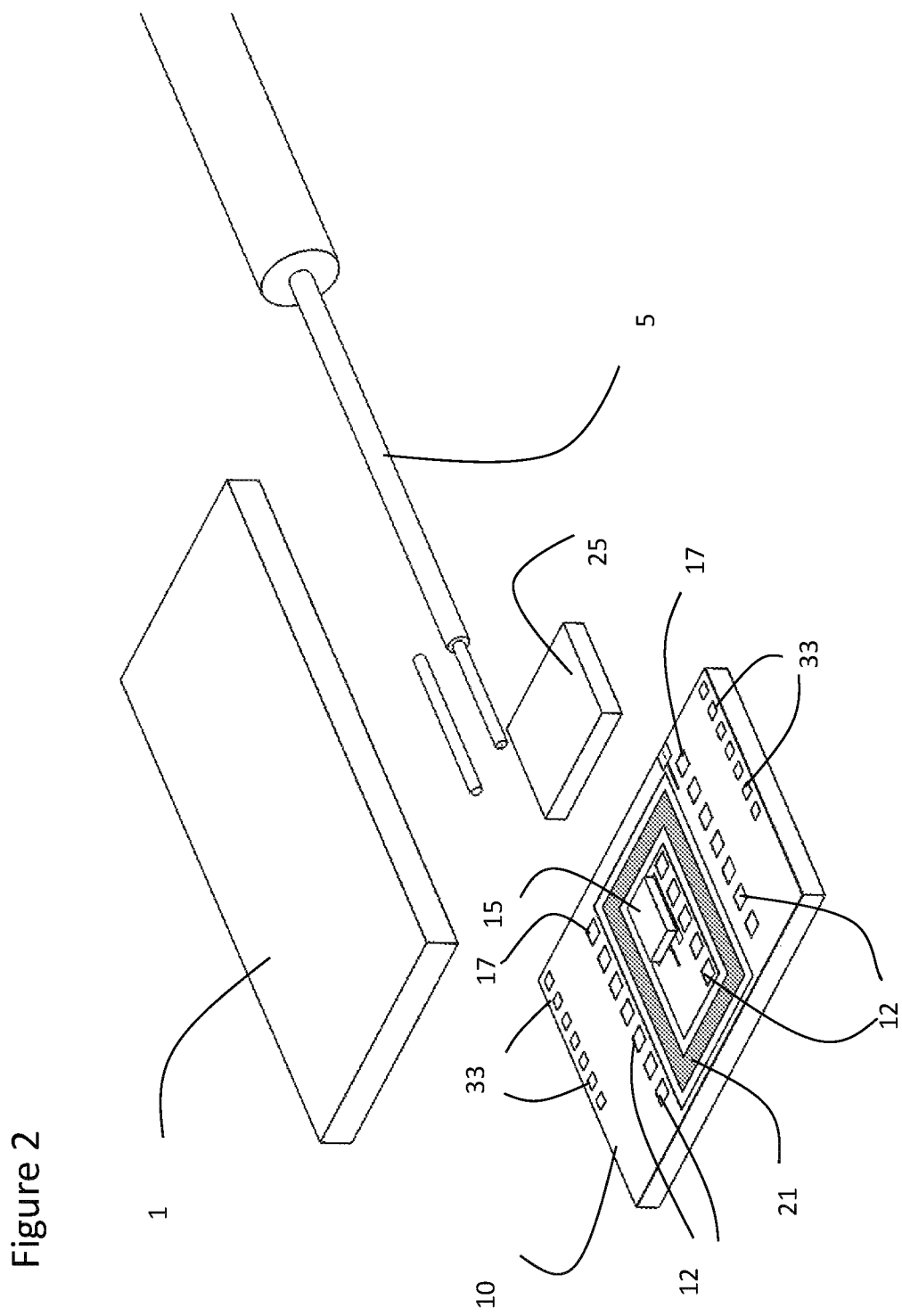
FIG. 2 illustrates an exploded view of an assembly of the optical fiber alignment device of FIG. 1 and a PIC.
Figure 3:
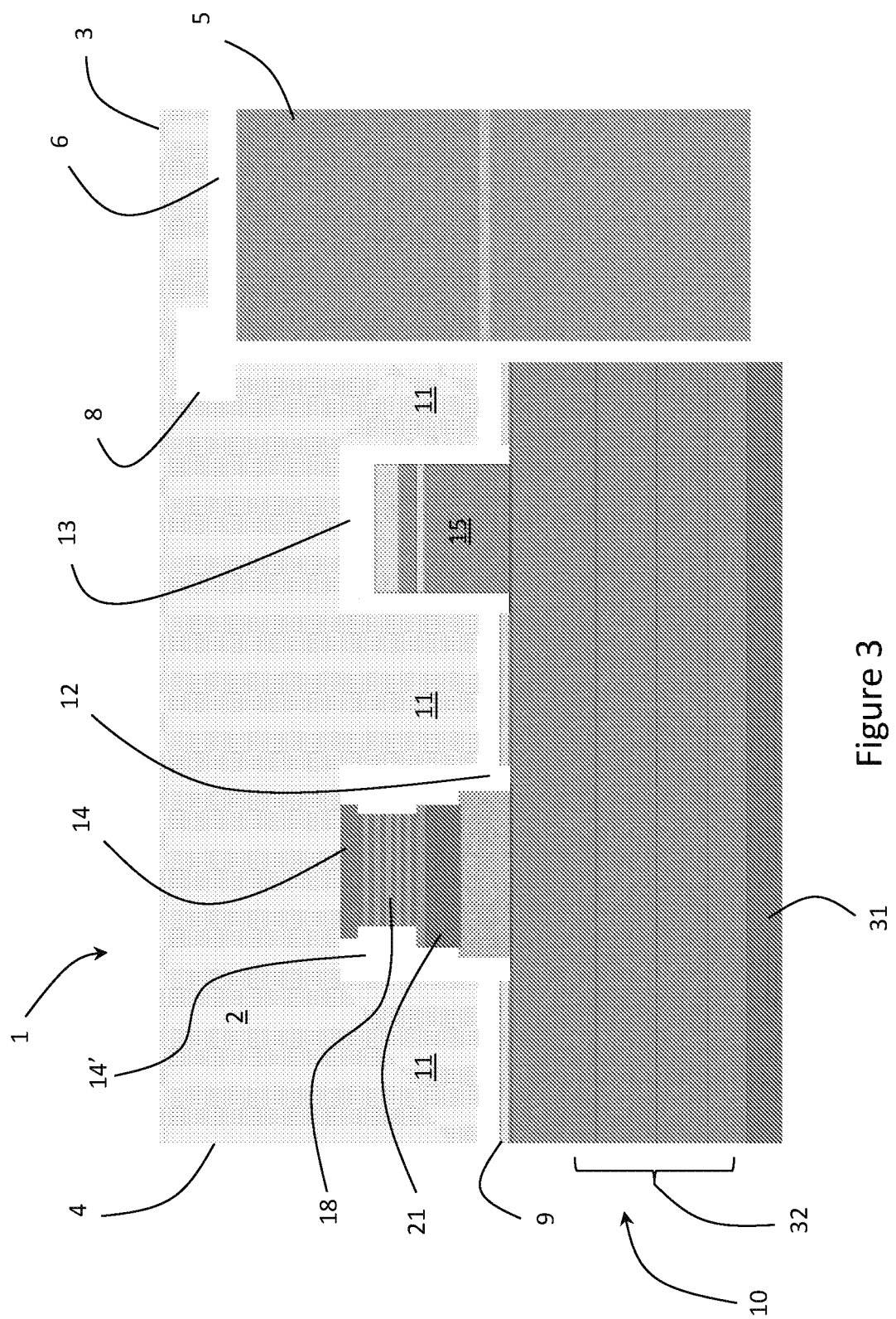
FIG. 3 illustrates a cross-sectional view of the assembly of the optical fiber alignment device of FIG. 1 mounted on a PIC prior to bonding.
Figure 4:
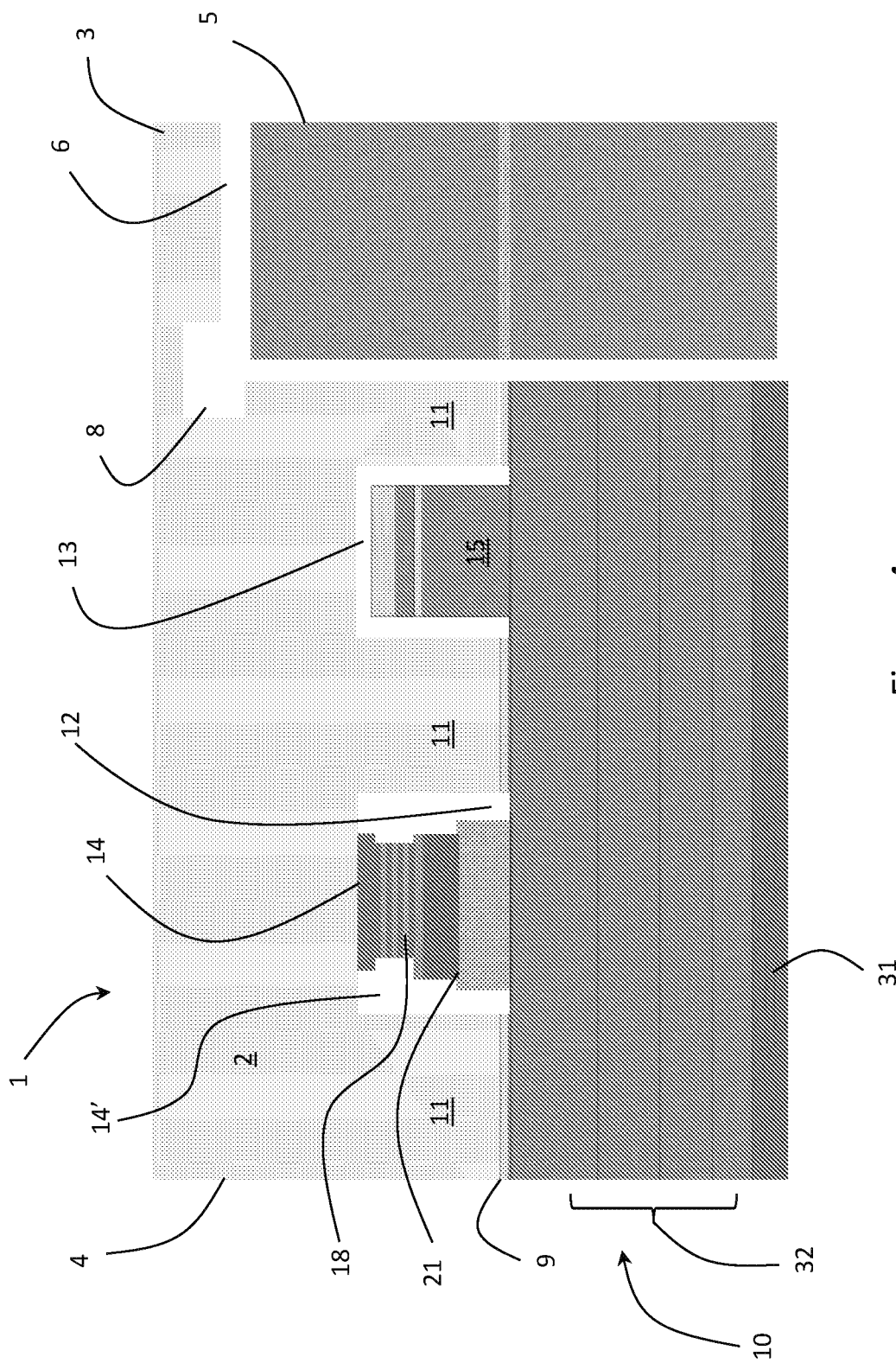
FIG. 4 illustrates a cross-sectional view of the assembly of FIG. 2 after bonding and optical fiber alignment.

The optical alignment and assembly of the fiber alignment device 1 to the PIC 10 may be achieved by "flip-chip" bonding the fiber alignment device 1 face down onto the PIC 10 and aligning the optical waveguide 9 to the grooves 6 in the plane of the surface of the fiber alignment device 1, i.e., X-Y alignment (see FIG. 2 & FIG. 3). Separate alignment fiducials may also be provided on the fiber alignment device 1 and the PIC 10 to attain the alignment accuracy needed. The X,Y alignment may be done with machine vision to within ±0.5 microns using fiducials on both parts. The fiducial for the fiber alignment device 1 may be the straight lines of the v-grooves 6, which may be aligned with some added or inherent feature on the PIC 10, e.g. waveguide feature.

Once X & Y alignment is obtained in the plane of the top surface of the PIC 10, the temperature of the fiber alignment device 1 and the PIC 10 may be raised to a point that the adhesive material 18, e.g., solder, between the bonding pads 16 and 17 will activate, e.g., melt, and the two components bond down through the openings 12 to a point where the hard-stop pillars 11 contact the hard stop surfaces, e.g., waveguide layer 9, on the PIC 10. At the same time, the adhesive, e.g., solder, on the ring seal 14 of the fiber alignment device 1 will activate, e.g. melt, and create an hermetic seal with the ring seal 21 around the corresponding components 15 disposed on top of the PIC 10. Then the temperature is lowered and the fiber alignment device 1 and the PIC 10 are released and tested for optical alignment accuracy.

In a preferred embodiment, the optical waveguide layer 9 is the hard stop layer for the vertical alignment of the fiber alignment device 1 on the PIC 10. Using the waveguide layer 9 eliminates all the uncertainty and tolerance issues of having a hard stop on any thick layers above the optical waveguide 9. Accordingly, all of the tolerances needed for the optical alignment are met. The center of the optical waveguide 9 is typically 0.7 microns below the top surface. For comparison, the fiber core in the fiber 5 is typically 8.2 microns in size so that the fiber core is much bigger than the depiction of the exact location of the center of the optical layer. In fact, the actual light output is 10 microns in diameter so that it overshadows all of them. Ideally, the locations, where the actual light goes in the waveguide 9, do not have any alignment features, e.g., pillars 11, landing directly on top of them because that would interrupt the light beam, but the hard stops land on that same layer, just not where the light is travelling.

In an embodiment of the present invention, in which the component 15 comprises an upside down gain chip or other component requiring grounding, the ground side of the upside-down gain chip may be connected to the walls, e.g. bottom wall, of the deep cavity 13 in the fiber alignment device 1 to provide improved thermal performance and a better ground connection. Connection can be achieved with either a solder or a conductive high-temperature epoxy material.

Finally, the fiber 5, or an array of fibers 5, is then placed passively into position in the groove 6 on the fiber alignment device 1, butted up against the PIC 10, and epoxied, or other suitable adhesive or fixing method, into position. Ideally, a glass plate 25 is mounted above each fiber 5 to push them into position and give them support from above. Excess epoxy or adhesive can collect in the trough 8 at the front end of the fibers 5.

Figure 5:
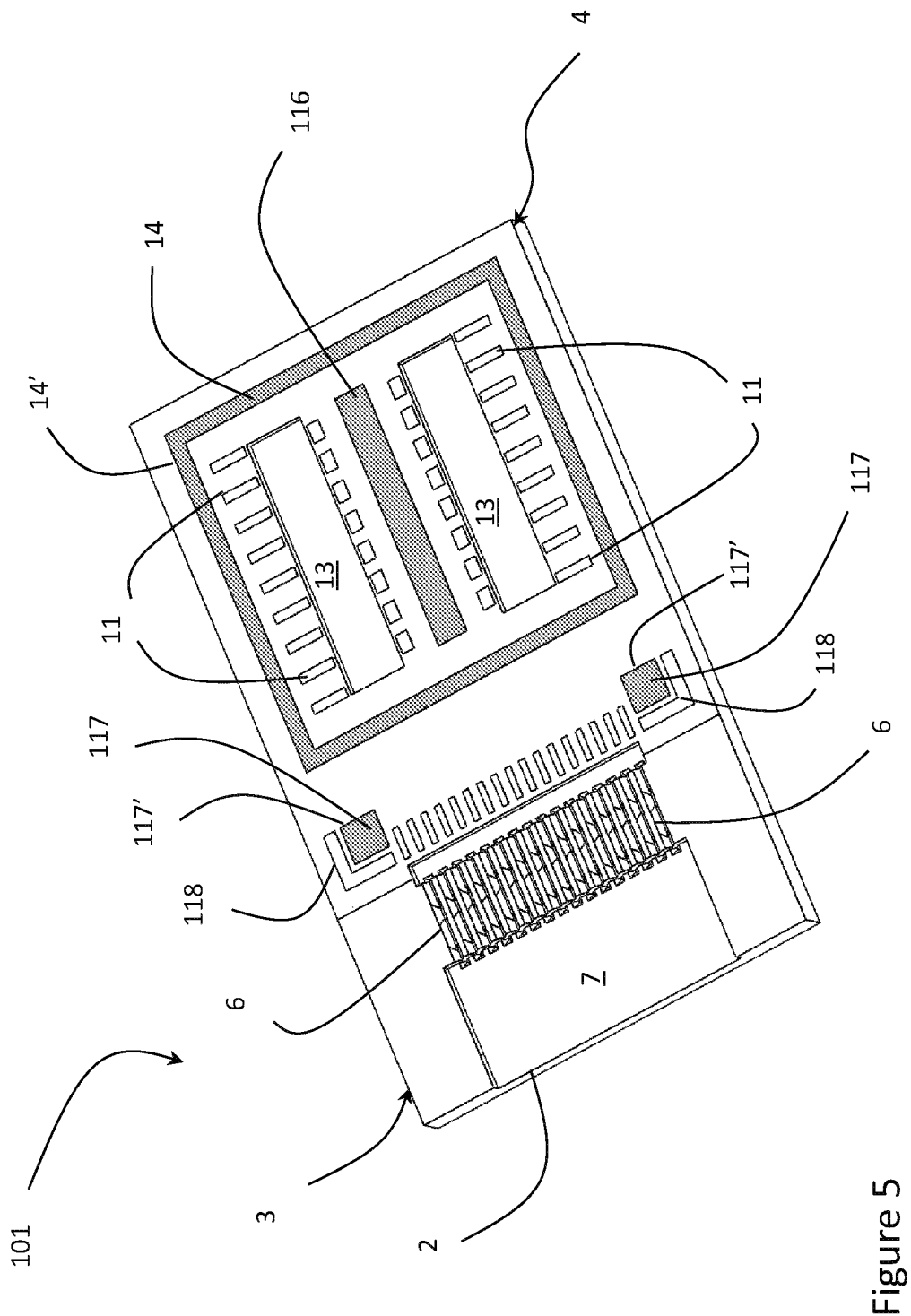
FIG. 5 illustrates an isometric view of an alternate embodiment of an optical fiber alignment device according to the present disclosure.
Figure 6:
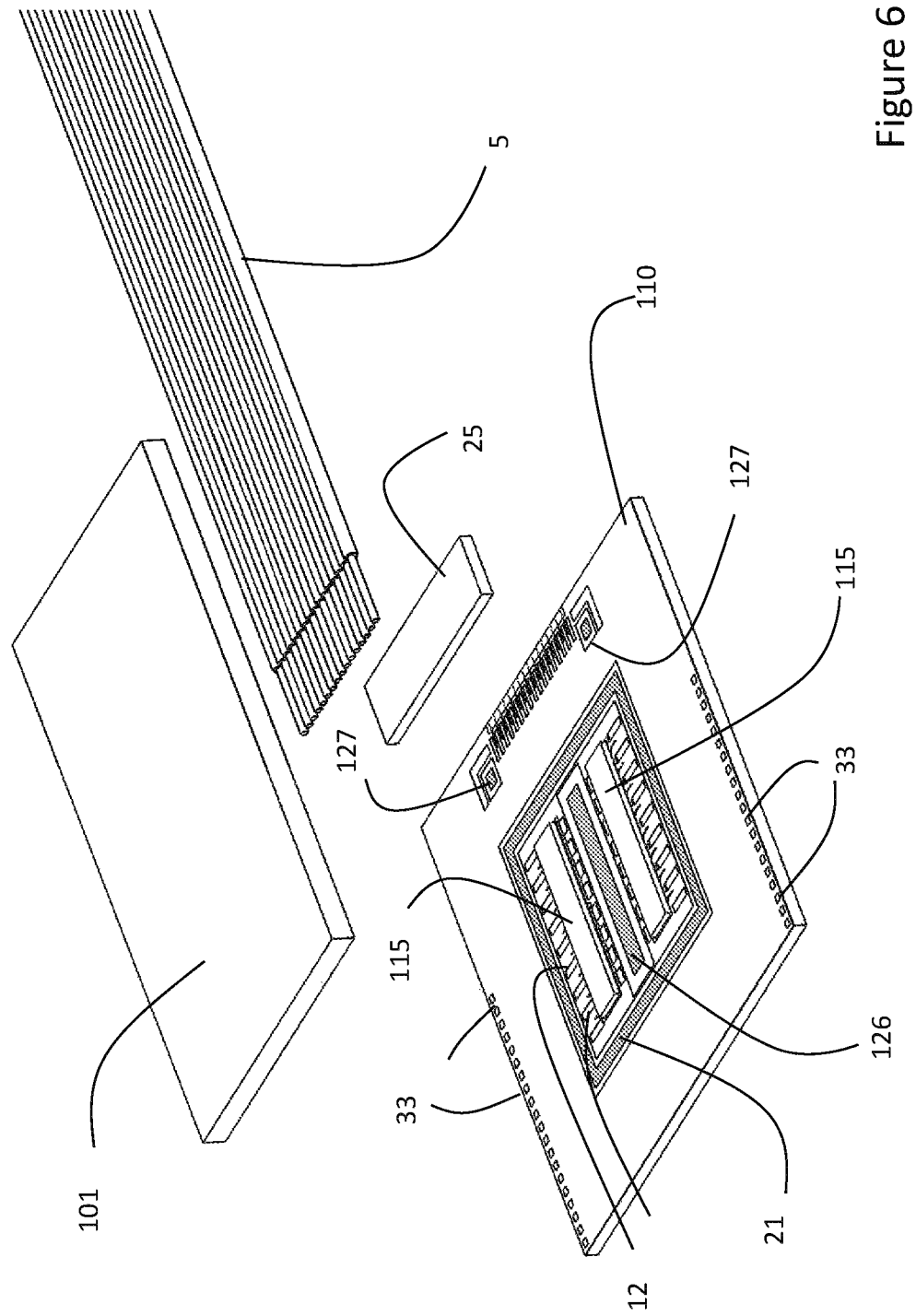
FIG. 6 illustrates an exploded view of an assembly of the optical fiber alignment device of FIG. 5 and a PIC.

In an alternative embodiment illustrated in FIGS. 5 and 6, a fiber alignment device 101 aligns a plurality of cores of an array of optical fibers 5 with a plurality of cores from an array of optical waveguides 9 on a photonic integrated circuit (PIC) 110. The PIC 110 includes two laser arrays 115, each comprising a plurality of lasers, which launch light onto respective waveguides 9. Accordingly, the fiber alignment device 101 includes two deep cavities 13 for receiving the two laser arrays 115, and a bonding pad ring 14 surrounding the two deep cavities 13. For added structural integrity, a large rectangular bonding bad 116 is provided between the laser arrays 115, extending approximately the length of the laser arrays 115, and a large square bonding pad 117 is provided on each side of the fiber 6/waveguide 9 junction, outside of the bonding pad ring 14. As above, each of the bonding pads 14 and 116, 117 is mounted in a recess 14', 116' and 117', respectively, to trap excess bonding material displaced during assembly.

The PIC 110 includes the bonding pad ring 21 corresponding to the bonding pad ring 14, a large rectangular bonding pad 126 corresponding to the rectangular bonding pad 116, and a pair of square bonding pads 127 corresponding to the square bonding pads 117. The adhesive material, e.g., solder 18, is placed between the corresponding bonding pads and activated during assembly, as hereinbefore described.

Ideally, in the illustrated embodiment, there is an array of the first alignment features 11 adjacent each laser array 115 within the bonding pad ring 14, as well as an L-shaped first alignment feature 118 on either side of the fiber 6/waveguide 9 junction.

The remaining elements perform the same or similar functions as those with like reference numerals from the first embodiment.

A plurality of fiber alignment devices 1 may be attached to a single PIC 10, and a plurality of PICs 10 may be attached to a single fiber alignment device 1. Also, other electrical or electro-optic components, e.g., chips, may be bonded and/or electrically connected to the fiber alignment device either on the top surface of the fiber alignment device 1 or the bottom surface inside a deep cavity 13.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A photonic integrated chip (PIC) assembly comprising:
    a PIC, including:
        a substrate;
        an electronic or opto-electronic component mounted on the substrate;
        an optical waveguide in an optical waveguide layer mounted on the substrate; and
        first alignment features;
    an optical fiber alignment device mounted on the PIC comprising:
        a base;
        a groove in said base for receiving a portion of an optical fiber, whereby a core of the optical fiber is aligned with a core of the optical waveguide of the PIC; and
        second alignment features for abutting the first alignment features;
    wherein one of the first or second alignment features comprise openings down to corresponding hard stops;
    wherein the other of the first or second alignment features comprises pillars extending into the openings abutting the hard stops; and
    wherein the first or second alignment features comprise an array of pillars on each side of the electronic or opto-electronic component.

2. The assembly according to claim 1, wherein the first alignment features comprise openings in the PIC down to corresponding hard stops; and wherein the second alignment features comprise pillars extending from the optical fiber alignment device into the openings abutting the corresponding hard stop.

3. The assembly according to claim 2, wherein each the hard stop comprises the optical waveguide layer.

4. The assembly according to claim 1, wherein each opening is substantially wider than each corresponding pillar, enabling horizontal (X-Y) alignment.

5. The assembly according to claim 1, further comprising:
    first bonding pads mounted in recesses on the base; and
    second bonding pads on the PIC for bonding with the first bonding pads via a bonding material disposed therebetween; and
    whereby excess adhesive material is trapped in the recesses during and after assembly.

6. The assembly according to claim 1, further comprising a trough extending from an outer free end of the groove for collecting excess material used to bond the optical fiber in the groove.

7. The assembly according to claim 1, further comprising a cavity in the base for receiving the electronic or opto-electronic component extending from the PIC.

8. The assembly according to claim 7, wherein the electronic or opto-electronic component comprises an array of lasers;

wherein the PIC includes a plurality of additional waveguides in the waveguide layer optically coupled to the array of lasers; and wherein the optical fiber alignment device includes a plurality of additional grooves in the base for a plurality of additional optical fibers optically aligned with the plurality of additional waveguides.

9. The assembly according to claim 7, further comprising a hermetically sealable material surrounding an opening to the cavity for hermetically sealing the electronic or opto-electronic component within the cavity.

10. The assembly according to claim 7, further comprising a ground connection between the cavity in the base and the electronic or opto-electronic component extending from the PIC, for grounding the electronic or opto-electronic component to the fiber alignment device.

11. A method of aligning an optical fiber to an optical waveguide on a photonic optical chip (PIC) comprising:
    providing an optical fiber alignment device for aligning the optical fiber with the optical waveguide on the photonic integrated circuit (PIC) comprising:
        a base;
        a groove in said base for receiving a portion of the optical fiber, whereby a core of the optical fiber is aligned with a core of the optical waveguide of the PIC;
        first alignment features;
    providing the PIC, comprising:
        a substrate;
        an electronic or opto-electronic component mounted on the substrate;
        the optical waveguide in an optical waveguide layer mounted on the substrate;
        second alignment features for abutting with the first alignment features;
    wherein one of the first or second alignment features comprise openings down to corresponding hard stops;
    wherein the other of the first or second alignment features comprises pillars extending into the openings abutting the hard stops;
    wherein the first or second alignment features comprise an array of pillars on each side of the electronic or opto-electronic component;
    mounting the optical fiber alignment device on the PIC with the first alignment features aligned with the corresponding second alignment features;
    aligning the optical fiber with the optical waveguide; and
    fixing the optical fiber alignment device to the PIC.

12. The method according to claim 11, wherein each opening is substantially wider than each corresponding pillar, enabling horizontal (X-Y) alignment; and
    further comprising aligning the fiber alignment device to the PIC in an X-Y plane.

13. The method according to claim 11, wherein the first alignment features comprise openings in the PIC down to corresponding hard stops; and wherein the second alignment features comprise pillars extending from the optical fiber alignment device into the openings abutting the corresponding hard stops.

14. The method according to claim 13, wherein providing the optical fiber alignment device includes etching a top surface of the optical fiber alignment device leaving the pillars.

15. The method according to claim 13, wherein the hard stops comprise the optical waveguide layer; and
    wherein providing the PIC includes etching the openings in the PIC down to the waveguide layer.

16. The method according to claim 11, wherein the optical fiber alignment device further comprises first bonding pads mounted in recesses in the base; and
    wherein the PIC further comprises second bonding pads for bonding with corresponding first bonding pads on the optical fiber alignment device via an adhesive material disposed therebetween; and
    wherein the method further comprises activating the adhesive, whereby the adhesive flows and the first alignment features of the fiber alignment device move into contact with the hard stops of the PIC, whereby excess adhesive is trapped in the recesses during activation.

* * * * *